Nov. 22, 1938.   C. D. WALLACH   2,137,322
THERMAL INSULATING STRUCTURE FOR VEHICLE FLOORS
Filed April 10, 1935   2 Sheets-Sheet 1
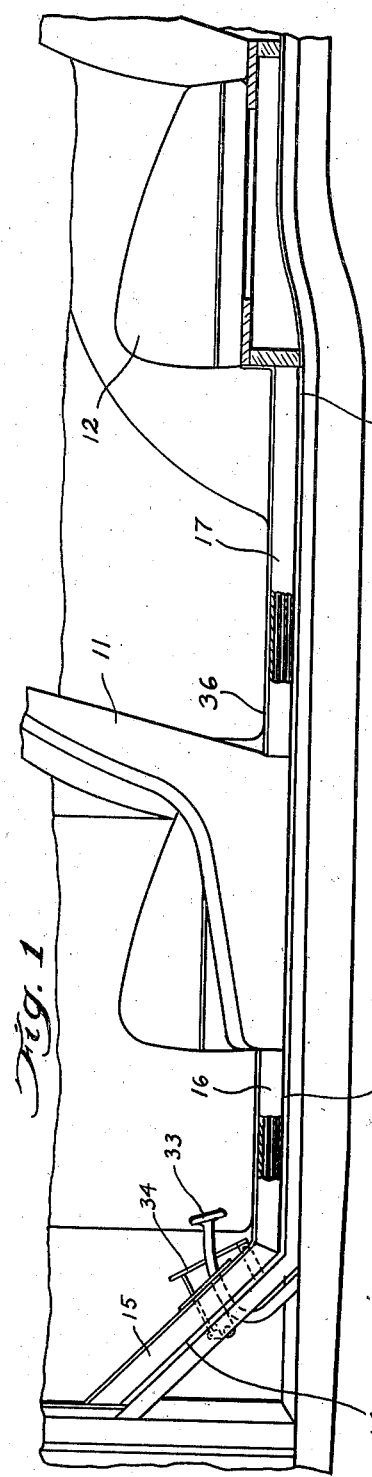
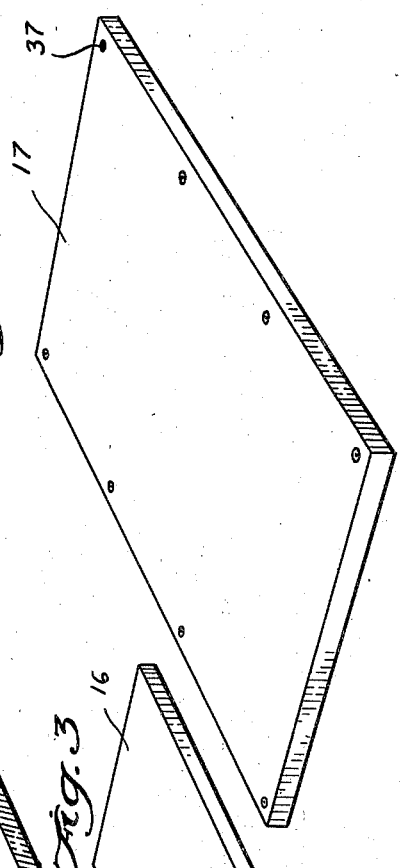
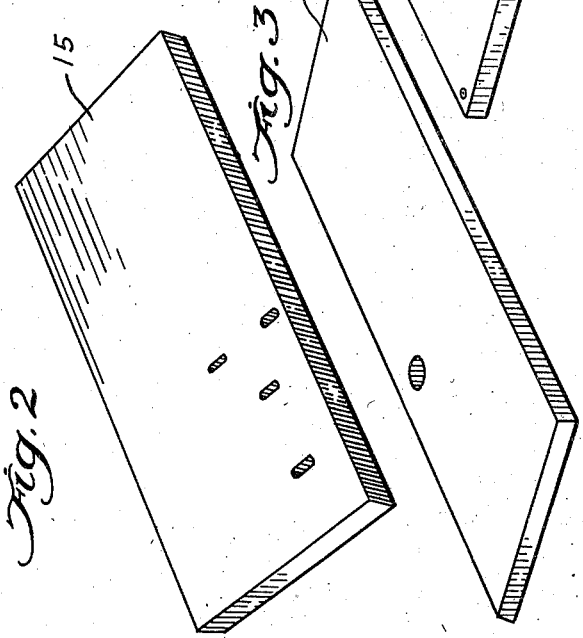
Inventor:
Carl D. Wallach Nov. 22, 1938.  C. D. WALLACH  2,137,322
THERMAL INSULATING STRUCTURE FOR VEHICLE FLOORS
Filed April 10, 1935  2 Sheets-Sheet 2
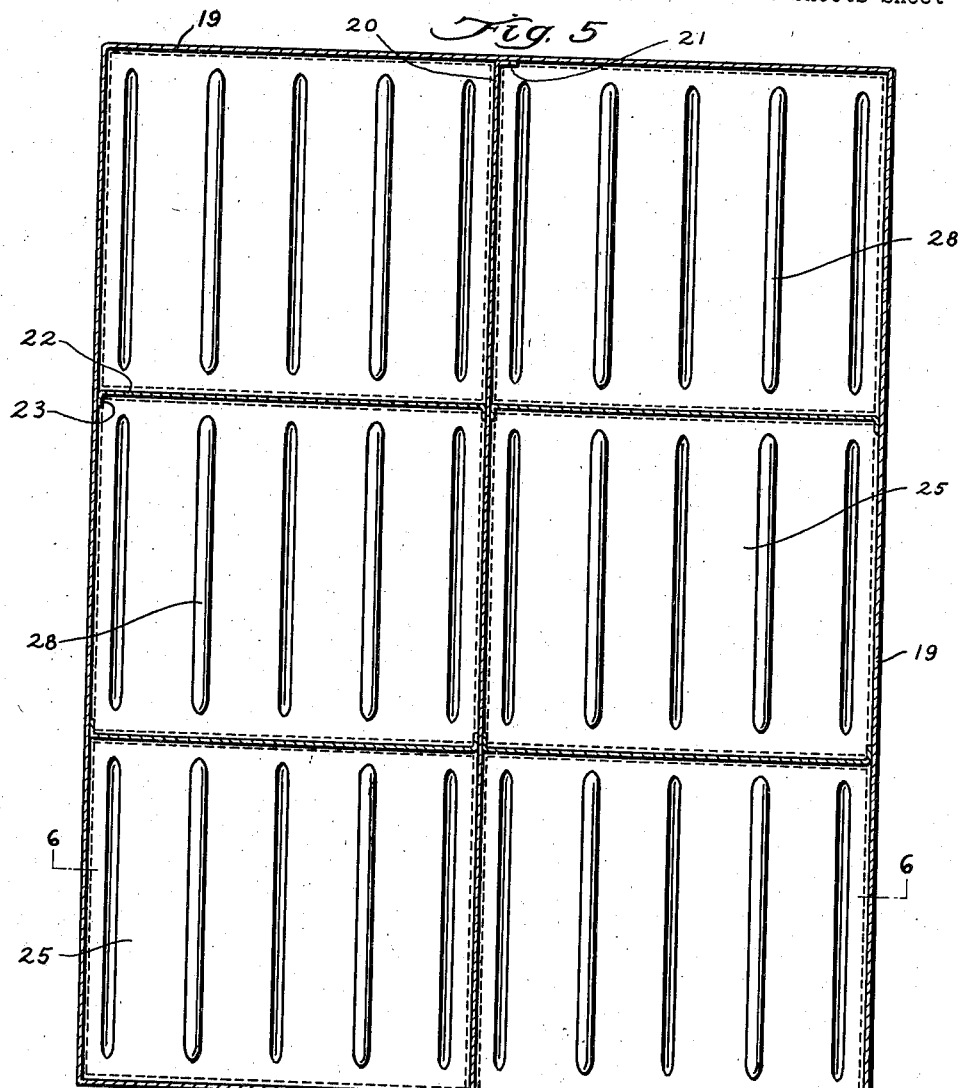
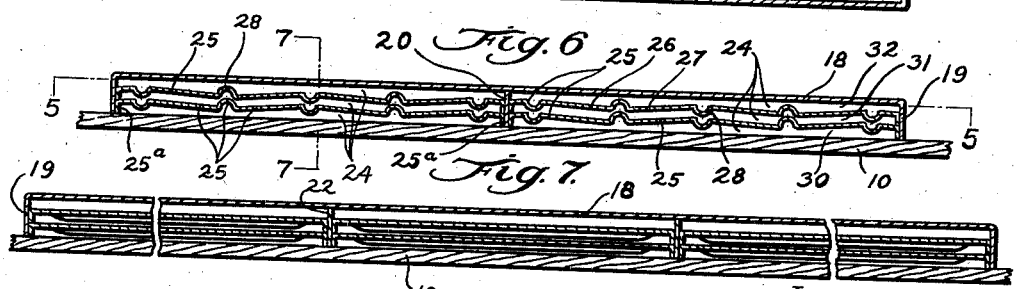
Inventor:
Carl D. Wallach Patented Nov. 22, 1938

2,137,322

UNITED STATES PATENT OFFICE 2,137,322

THERMAL INSULATING STRUCTURE FOR VEHICLE FLOORS

Carl Douglass Wallach, Newburgh, N. Y., assignor to Richard Laurence Parish, New York, N. Y.

Application April 10, 1935, Serial No. 15,577

2 Claims. (Cl. 296—75)

My invention relates generally to thermal insulation structure, and it has to do particularly with structure for thermally insulating floors of vehicles.

One of the objects of my invention is to provide a novel means for insulating the floors of vehicles.

Another object is to provide means of the foregoing character which is of unitary form and may be readily and easily applied to and removed from the vehicle floor.

A further object is to provide a novel insulation mat structure arranged to insulate against the transfer of heat by radiation, conduction and convection.

Still another object is to provide an all-metal mat structure of the foregoing character which includes a plurality of metallic sheets joined together as a single unit in spaced relationship with respect to each other, the metallic sheets being of sufficient stiffness and thickness to withstand preformed shape and also having relatively low reflective characteristics when exposed to visible radiation and relatively high reflective characteristics when exposed to infra-red radiation.

Additional objects are to provide a simple and inexpensive mat structure of the foregoing character; to provide a mat structure that is strong and durable and will serve its intended purpose for an indefinite time with continued high efficiency; and to provide an insulating means that may be readily concealed by the usual vehicle floor carpet or covering so that the appearance of the vehicle is in no way impaired, such means being so constructed and arranged that it may be applied to the vehicle floor without change in the latter or any other part of the vehicle.

Other objects and advantages will become apparent as this description progresses and by reference to the drawings, in which,—

Fig. 1 is a fragmental view, partially in section, of one form of vehicle construction having my invention applied thereto;

Figs. 2, 3 and 4 are detached perspective views of the front and rear insulation mats, respectively, shown in Fig. 1;

Fig. 5 is an enlarged horizontal sectional view of the rear insulating mat of Fig. 4, which section is taken substantially on line 5—5 of Fig. 6;

Fig. 6 is a section taken substantially on line 6—6 of Fig. 5; and

Fig. 7 is a section taken substantially on line 7—7 of Fig. 6.

My invention is adaptable to the floors of various vehicles; however, it is particularly adaptable to motor vehicle floors, and I have, therefore, illustrated my invention as applied to this form of vehicle.

The particular vehicle body structure shown in Fig. 1 includes a rear floor 10 located between front and rear seats 11, 12, a front floor section 13 immediately in front of the front seat 11 and between such seat and a footboard floor section 14. These floor sections 10, 13 and 14, as will be understood, are defined by the side wall construction of the vehicle body and the seats mentioned.

My invention has to do particularly with a thermal insulation mat adapted to be removably mounted upon the vehicle floor so as to insulate the interior of the vehicle body from the transfer of heat thereinto through the floor by radiation, conduction and convection. The mat structure which I employ for this space will now be described.

The floor sections 10, 13 and 14 may be provided with separate mats 15, 16, 17, one form of each of which is shown in Figs. 2 to 4, inclusive. All of these mats are of similar construction and I, therefore, have illustrated, and will describe, only one of them (the rear mat 17) in detail.

The rear mat 17 includes an outer metallic shell having the outline dimensions of the rear floor space to be insulated. This shell is of U-shape in cross-section, and it has a continuous, peripheral edge flange 19, the free edge of which is adapted to seat upon the floor 10. This shell is strengthened by an internal strip 20 having end flanges 21 welded, or otherwise suitably secured, to the central portion of the inner sides of the shell flange 19. Other or transverse brace strips 22 are mounted within the shell 18 at substantially right angles to the brace strip 20, and they are provided with end flanges 23 that are secured, respectively, to the brace strips 20 and the shell flange 19 by welding or other suitable means. In this way, the interior of the shell is divided into a plurality of similar spaces 24, the bottoms of which are closed by the floor 10 to form a plurality of closed insulating spaces. The outer shell 18 and the brace strips 20, 22 are of substantial thickness and stiffness so that when the shell is applied to the car floor it will readily bear the weight of the vehicle occupants.

To insulate against the transfer of heat through the floor into the vehicle body, I mount in each space 24 a plurality of similarly formed metallic sheets 25. These sheets are comparatively thin but they are of sufficient thickness and stiffness to take and retain preformed shape. I have found that sheets of approximately .006 inch thickness well serve the purpose; but it is to be understood that the thickness may be varied without departing from the invention.

The metallic sheets 25 are also formed of a material having exposed surfaces possessing relatively low reflective characteristics when exposed to visible light (or radiation of wave lengths falling within the visible portion of the electromagnetic spectrum) and relatively high reflective characteristics when exposed to infra-red radiation (or radiation of longer wave lengths than the visible portion of the electromagnetic spectrum). One form of material that well serves this purpose consists of a metallic sheet coated with an alloy consisting of at least 70% lead and the remainder tin. The purpose will also be well served by the use of ordinary commercial black steel.

The metallic shell 18 is preferably formed of the same material as the metallic sheets 25; however, it is to be understood that, if found desirable in certain instances, the shell may be formed of other material, metallic or otherwise. It may take the form of stiff fibre or the like material of low heat-conducting capacity.

The metallic sheets 25, preferably, have their surfaces shaped to provide a plurality of angular and intersecting plane surfaces 26, 27 with ribs 28 at the intersections of the plane surfaces. This arrangement not only adds to the insulating ability of the metallic sheets but it also strengthens them against vibration, avoiding undesirable noises and lengthening the life of the structure as a whole.

The metallic sheets 25, in each space 24, are so mounted that they are substantially parallel with each other, the top of shell 18 and with the floor 10. The sheets are preferably provided with preformed edge flanges 25ª that are secured, by welding or otherwise, to the brace strips 20, 22 and the shell flange 19, as the case may be.

The metallic sheets may be spaced with respect to each other and to the facing surfaces defining the space 24 in any desired manner; but for best results, particularly in the use of my invention during warm and hot weather, I preferably mount the lowermost sheet 25 comparatively close to the floor 10 with the other sheet spaced an increased distance from the first sheet and with second sheet spaced a still greater distance from the top shell wall. This arrangement provides a comparatively shallow space 30 adjacent the floor 10 and upper spaces 31 and 32 of progressively increased depth.

In the use of the structure above described, the mat as a whole may be made up and applied to the vehicle as a unit. It may be applied without any change in the vehicle body. The front units 15 and 16, being constructed similarly to the unit 17, may be applied in a like manner to the front floor and footboard sections 13, 14. The sections 15 and 16 will, of course, be provided with suitable openings to accommodate the operating and control devices such as indicated at 33, 34. The rear unit 17, after it is applied to the car floor, is covered with a carpet 36, or other suitable material. The top of the shell 18 may be provided with snap sockets or other attachment means by which the carpet may be secured thereto in a manner well understood. This may be true also with respect to both of the floor sections 15 and 16.

It is believed that the operation and advantages of my invention will be readily understood from the foregoing. Furthermore, it is to be understood that while I have shown only one form of structure embodying my invention, other changes in details and arrangements of parts may be made without departing from the spirit and scope of my invention as defined by the claims that follow. For example, without limiting the foregoing generally, the number of metallic sheets 25 may be varied. The size and number of spaces 24 may be varied. The front units 15, 16 may be constructed as a single unit. In some cases the metallic sheets may be plain without angular surfaces, or they may take any other shape found desirable.

I claim:

1. A detachable substantially hollow boxing for insulating the floor of a vehicle which includes an outer substantially rigid metallic shell having a closed top and an open bottom adapted to be closed by the floor on which the shell is adapted to be placed, and an insulating sheet mounted in said shell in spaced and substantially parallel relation with respect to the top of said shell and the floor, and forming with said shell, such other, and said floor, isolated air spaces, said sheet being formed of a comparatively thin sheet of heat reflecting insulating material of sufficient thickness and stiffness to retain preformed shape, and forming with said shell and said floor insulated air spaces.

2. A thermal-insulating device for vehicle floors, comprising a removable unit adapted to completely cover a section of said floor and to be positioned beneath any carpet or other covering used on said section, said unit including a stiff metallic cover member having downwardly-flanged sides and an open bottom and a plurality of downwardly-extending spaced transverse and longitudinal crossing ribs of the same depth as the sides and adapted to break up the supporting area of the cover into a plurality of smaller adjacent areas, there being in each said smaller area a plurality of heat-insulating sheets spaced to provide superimposed insulating air spaces between said sheets and between the lower sheets and the floor on which the unit is adapted to be positioned, each of said sheets having marginal flanges for attachment to the side members of its encompassing structure and a plurality of parallel spaced reinforcing ribs terminating short of its flanged ends and of a material which is stiff enough and thick enough to retain preformed shape and which has a high heat reflectivity characteristic.

CARL DOUGLASS WALLACH.

CERTIFICATE OF CORRECTION.

Patent No. 2,137,322.  November 22, 1938.

CARL DOUGLASS WALLACH.

It is hereby certified that error appears in the printed specification of the above numbered patent requiring correction as follows: Page 2, second column, line 17, for the word "generally" read generality; lines 33 and 34, claim 1, strike out the words and comma "and forming with said shell, such other, and said floor, isolated air spaces,"; line 39, same claim, for "insulated" read isolated; and that the said Letters Patent should be read with this correction therein that the same may conform to the record of the case in the Patent Office.

Signed and sealed this 16th day of May, A. D. 1939.

Henry Van Arsdale (Seal) Acting Commissioner of Patents.